United States Patent
Roth

(10) Patent No.: US 8,778,100 B2
(45) Date of Patent: Jul. 15, 2014

(54) MAGNETIC STRIP, SENSOR COMPRISING A MAGNETIC STRIP AND PROCESS FOR THE MANUFACTURE OF A MAGNETIC STRIP

(75) Inventor: Ottmar Roth, Gruendau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 876 days.

(21) Appl. No.: 12/895,798

(22) Filed: Sep. 30, 2010

(65) Prior Publication Data

US 2011/0076508 A1 Mar. 31, 2011

Related U.S. Application Data

(60) Provisional application No. 61/247,182, filed on Sep. 30, 2009.

(30) Foreign Application Priority Data

Sep. 30, 2009 (DE) .......................... 10 2009 043 462

(51) Int. Cl.
*H01F 1/047* (2006.01)
*H01F 1/147* (2006.01)
*H01F 41/02* (2006.01)

(52) U.S. Cl.
CPC ........ *H01F 1/14708* (2013.01); *H01F 41/0213* (2013.01); *H01F 1/047* (2013.01)
USPC ...................................................... 148/557

(58) Field of Classification Search
CPC .................................. C21D 8/04; H01F 1/047
USPC ......................................................... 148/557
See application file for complete search history.

(56) References Cited

U.S. PATENT DOCUMENTS

| | | | |
|---|---|---|---|
| 5,786,762 A * | 7/1998 | Liu ................................ | 340/551 |
| 6,137,412 A | 10/2000 | Herzer | |
| 6,166,636 A * | 12/2000 | Herget et al. .............. | 340/572.6 |
| 6,259,368 B1 * | 7/2001 | Ruhrig ........................ | 340/572.6 |
| 6,313,746 B1 | 11/2001 | Emmerich et al. | |
| 6,663,981 B1 | 12/2003 | Weber et al. | |
| 2011/0074529 A1 * | 3/2011 | Roth ............................. | 335/219 |

FOREIGN PATENT DOCUMENTS

| | | |
|---|---|---|
| DE | 1433766 | 10/1969 |
| DE | 3611342 A1 | 10/1987 |
| DE | 197 32 872 A1 | 2/1999 |
| DE | 196 53 430 A1 | 4/1999 |
| DE | 199 18 589 A1 | 10/2000 |
| EP | 0 316 811 A2 | 5/1989 |
| GB | 860127 | 2/1961 |
| GB | 1057904 | 2/1967 |
| JP | 02032510 A * | 2/1990 |

OTHER PUBLICATIONS

English translation of DE 3611342 A1, Apr. 1987.*

* cited by examiner

*Primary Examiner* — Jie Yang
(74) *Attorney, Agent, or Firm* — Dickinson Wright PLLC

(57) ABSTRACT

The invention relates to a magnetic strip, wherein the strip has a magnetic easy axis which is axially parallel to a transverse axis of the strip. The strip is cut to length, from strip material made of a semi-hard magnetic crystalline alloy, along a transverse axis of the strip material substantially corresponding to a length (l) of the strip. The strip material has a magnetic easy axis which runs axially parallel to the transverse axis of the strip material.

27 Claims, 4 Drawing Sheets

MAGNETIC STRIP, SENSOR COMPRISING A MAGNETIC STRIP AND PROCESS FOR THE MANUFACTURE OF A MAGNETIC STRIP

This application claims the benefit under 37 C.F.R. §119 of the filing dates of U.S. Provisional Application No. 61/247,182 entitled MAGNETISCHER STREIFEN, SENSOR AUFWEISEND EINEN MAGNETISCHEN STREIFEN UND VERFAHREN ZUR HERSTELLUNG EINES MAGNETISCHEN STREIFENS, filed Sep. 30, 2009, and German Patent Application No. 10 2009 043 462.3, entitled MAGNETISCHER STREIFEN, SENSOR AUFWEISEND EINEN MAGNETISCHEN STREIFEN UND VERFAHREN ZUR HERSTELLUNG EINES MAGNETISCHEN STREIFENS, filed Sep. 30, 2009. The entire content of each being hereby incorporated herein by reference.

BACKGROUND

1. Field

Disclosed herein to a magnetic strip, a sensor with a magnetic strip, and a method of manufacturing a magnetic strip.

2. Description of Related Art

Known from DE 199 18 589 A1 is an embodiment of a magnetic marking strip for generating a signal within a scanning zone which contains a periodically changing magnetic field with a predetermined basic frequency. The signal generated by the marking strip is picked up by a scanning device and, if an harmonic of a higher order of the basic frequency is found, generates a display which consists of a signal strip of ferromagnetic material with a low coercive field strength to which is applied ferromagnetic material with a coercive field strength significantly greater than the material of the signal strip. The signal strip is cut to length from strip material made of an amorphous, ductile, virtually magnetostriction-free alloy, at right-angles to the longitudinal axis of the strip material. The strip material has a flat B-H loop axially parallel to its longitudinal axis.

SUMMARY

Disclosed herein is a magnetic strip, in particular for a sensor, and a method of manufacturing a magnetic strip, which allow a magnetic preferred direction along a special axis of the strip, while at the same time providing a strip that is easy to manufacture.

According to one embodiment, a magnetic strip is provided, wherein the strip has a magnetic easy axis which is axially parallel to a transverse axis of the strip. The strip is cut to length, from strip material made of a semi-hard magnetic crystalline alloy, along a transverse axis of the strip material substantially corresponding to a length of the strip. The strip material has a magnetic easy axis which runs axially parallel to the transverse axis of the strip material.

The term "semi-hard magnetic" refers to alloys lying between soft magnetic and hard magnetic alloys in respect of coercive field strength. A "magnetic easy axis" is understood to mean that direction in which the magnetisation energy is smallest.

Due to the fact that the magnetic strip described herein has a magnetic easy axis which is axially parallel to a transverse axis of the strip, the strip has a magnetic preferred direction which stands at right-angles to a longitudinal direction of the magnetic strip. The magnetic preferred direction is therefore arranged in the direction of a width of the magnetic strip. At the same time the magnetic strip with the magnetic easy axis parallel to its transverse axis is especially easy to manufacture, since the strip is cut to length from the strip material made of a semi-hard magnetic crystalline alloy which has a magnetic easy axis running axially parallel to its transverse axis, along the transverse axis of the strip material substantially corresponding to the length of the strip.

In a preferred embodiment, the alloy has a composition which is reproduced by the following general formula:

wherein M is at least one element, selected from the group consisting of Ni, Mn, Si, Cu, Al, Ti, V, Nb and W, wherein M' is at least one element, selected from the group consisting of C, N, S, P, B, H and O, and wherein the coefficients a, b, c, d, e, f satisfy the following relationships:

$a+b+c+d+e+f=100$ (% by weight)

$25 \leq b \leq 35$, $5 \leq c \leq 18$, $0 < d \leq 5$, $0 < e \leq 3$ and $0 \leq f \leq 1$.

In a preferred embodiment the alloy has a coercive field strength $H_c$ with 450 A/cm $\leq H_c \leq$ 610 A/cm.

In a further preferred embodiment the alloy has a remanence $B_r$ with 1.10 T $\leq B_r \leq$ 1.25 T.

In a another embodiment, the alloy has a composition which is reproduced by the following general formula:

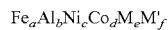

wherein M is at least one element, selected from the group consisting of Cu, Nb and Ti, wherein M' is at least one element, selected from the group consisting of C, N, S, P, B, H and O, and wherein the coefficients a, b, c, d, e, f satisfy the following relationships:

$a+b+c+d+e+f=100$ (% by weight)

$5 \leq b \leq 12$, $12 \leq c \leq 25$, $13 < d \leq 38$, $0 < e \leq 15$ and $0 \leq f \leq 1$.

In an especially preferred embodiment:
b=8, c=15, d=25 and 0<e<10.

The specified alloys have especially good magnetic properties.

A width of the strip material may correspond substantially to a width of the strip. This makes it even easier to produce the strip, since the width of the strip material already corresponds to its width, and further processing steps may therefore be dispensed with.

Especially preferred is for the width of the strip to be smaller than the length of the strip. In addition, the relationship 0 mm<d<0.1 mm preferably applies to a thickness d of the strip.

Also described herein is to a sensor, wherein the sensor has at least one magnetic strip in accordance with one of the embodiments described above. The alignment of the magnetic easy axis along the transverse axis of the strip has an especially beneficial effect in such a sensor.

In addition, described herein is a method of manufacturing a magnetic strip from a semi-hard magnetic, crystalline alloy, wherein the strip has a magnetic easy axis which is axially parallel to a transverse axis of the strip. The method has the following steps. Firstly the semi-hard magnetic alloy is smelted and the smelted alloy is cast as an ingot. In addition to that, the ingot is hot rolled into strip material which is then cold formed substantially to a thickness of the strip to be manufactured by rolling the strip material along a direction of rolling. Furthermore, the strip material is annealed in a magnetic field, wherein the direction of the magnetic field is axially parallel to a transverse axis of the strip material and wherein the transverse axis of the strip material is at right-angles to the rolling direction. In addition to this, a narrow strip is made by reducing a width of the rolled strip material substantially to a width of the strip to be produced, wherein the width of the strip material is arranged at right-angles to the rolling direction. Finally the strip to be produced is cut off from the narrow strip along the width of the narrow strip, substantially corresponding to a length of the strip to be produced.

The method described herein is suitable in an especially advantageous manner for simple production of the magnetic strip with a magnetic easy axis along the transverse axis of the strip. Consequently a magnetic strip with a magnetic preferred direction along a specific direction of the strip may be produced in an especially advantageous way.

In a preferred embodiment, before the annealing of the strip material in the magnetic field, the strip material is wound up and the annealing of the strip material is effected in the magnetic field on the coiled strip material.

After annealing of the strip material, tempering may take place. The tempering treatment is preferably conducted at a temperature $T_A$ between 500° C.$\leq T_A \leq$700° C.

A further method described herein for manufacturing a magnetic strip from a semi-hard magnetic, crystalline alloy, wherein the strip has a magnetic easy axis which is axially parallel to a transverse axis of the strip, has the following steps. Firstly the semi-hard magnetic alloy is smelted and the smelted alloy is cast as an ingot. In addition to that, the ingot is hot rolled into strip material which is then cold formed substantially to a thickness of the strip to be manufactured by rolling the strip material along a direction of rolling. In addition, a narrow strip is made by reducing a width of the rolled strip material substantially to a width of the strip to be produced, wherein the width of the strip material is arranged at right-angles to the rolling direction. Next, the strip to be produced is separated or cut off from the narrow strip along the width of the narrow strip, substantially corresponding to a length of the strip to be produced. Finally, the cut-off strip is annealed in a magnetic field, wherein the direction of the magnetic field is axially parallel to a transverse axis of the strip.

This method is also especially suitable for simple production of the magnetic strip with a magnetic easy axis along the transverse axis of the strip.

The annealing of the cut-off strip is conducted preferably at a temperature above approximately 1000° C.

After annealing of the cut-off strip, tempering may take place. The tempering treatment is preferably conducted at a temperature $T_A$ between 500° C.$\leq T_A \leq$700° C.

In a preferred embodiment, the alloy has a composition which is reproduced by the following general formula:

$$Fe_aCr_bCo_cMo_dM_eM'_f$$

wherein M is at least one element, selected from the group consisting of Ni, Mn, Si, Cu, Al, Ti, V, Nb and W, wherein M' is at least one element, selected from the group consisting of C, N, S, P, B, H and O, and wherein the coefficients a, b, c, d, e, f satisfy the following relationships:

$$a+b+c+d+e+f=100 (\% \text{ by weight})$$

$25 \leq b \leq 35$,
$5 \leq c \leq 18$,
$0 < d \leq 5$,
$0 < e \leq 3$ and
$0 \leq f \leq 1$.

In a preferred embodiment the alloy has a coercive field strength $H_c$ with 450 A/cm$\leq H_c \leq$610 A/cm.

In a further preferred embodiment the alloy has a remanence $B_r$ with 1.10 T$\leq B_r \leq$1.25 T.

In a another embodiment, the alloy has a composition which is reproduced by the following general formula:

$$Fe_aAl_bNi_cCo_dM_eM'_f$$

wherein M is at least one element, selected from the group consisting of Cu, Nb and Ti, wherein M' is at least one element, selected from the group consisting of C, N, S, P, B, H and O, and wherein the coefficients a, b, c, d, e, f satisfy the following relationships:

$$a+b+c+d+e+f=100 (\% \text{ by weight})$$

$5 \leq b \leq 12$,
$12 \leq c \leq 25$,
$13 < d \leq 38$,
$0 < e \leq 15$ and
$0 \leq f \leq 1$.

In an especially preferred embodiment:
b=8, c=15, d=25 and 0<e<10.

The specified alloys have especially good magnetic properties.

In a further preferred embodiment of the method according to the invention, the width of the strip to be produced is less than the length of the strip to be produced.

Also, the relationship 0 mm<d<0.1 mm preferably applies to the thickness of the strip to be produced.

The narrow strip may be produced by cutting the rolled strip material. In addition, the separation of the strip to be produced may be effected by cutting to length.

In a further embodiment, the production of the narrow strip and the separation of the strip to be produced are effected simultaneously by means of stamping.

The smelting of the alloy takes place preferably under vacuum or under a protective gas.

In a further embodiment, the hot forming of the ingot is carried out at a temperature above approximately 800° C.

Between the hot forming of the ingot and the cold forming of the strip material, intermediate annealing of the strip material may take place. The intermediate annealing of the strip material is preferably carried out at a temperature above approximately 800° C.

In one version of the method according to the invention, the cold forming of the strip material involves several cold rolling steps. At the same time, the strip material preferably undergoes intermediate annealing between the cold rolling steps. The intermediate annealing of the strip material between the cold rolling steps is preferably carried out at a temperature of approximately 700° C.

The intermediate annealing may be performed in particular to obtain especially good homogenisation and/or grain refinement, for forming and/or developing desired mechanical properties, in particular high ductility.

BRIEF DESCRIPTION OF DRAWINGS

The embodiments described herein will now be explained in detail with the aid of the appended figures.

DETAILED DESCRIPTION OF SPECIFIC EMBODIMENTS

Figure 1:
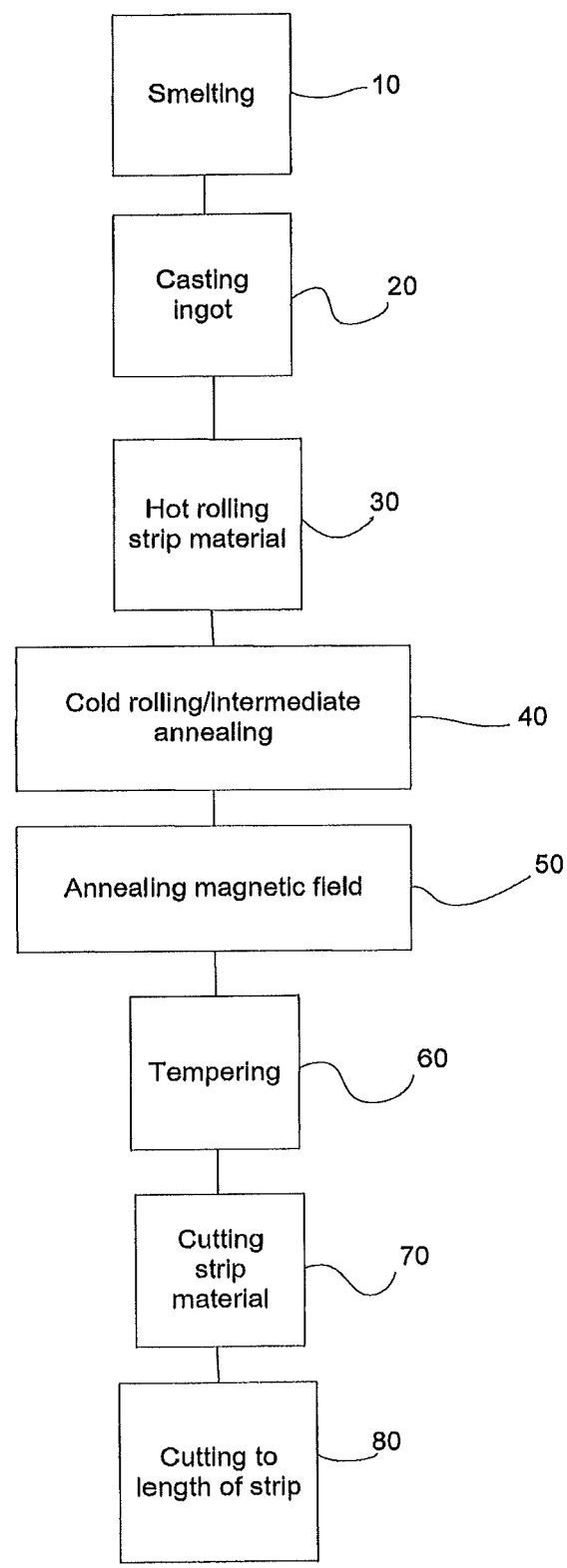
FIG. 1 shows a flow diagram with manufacturing steps for a magnetic strip according to a first embodiment disclosed herein.

FIG. 1 shows a flow diagram with manufacturing steps for a magnetic strip according to a first embodiment disclosed herein.

For this purpose, in a step 10, a semi-hard magnetic alloy is smelted in a crucible or oven under vacuum or in a protective gas atmosphere. Here the smelting is carried out for example at a temperature of approximately 1600° C.

In a step 20, an ingot is then formed, for example in a round ingot mould. In a further process step 30, the ingot is hot formed into strip material, typically by means of hot rolling. In another process step 40, the strip material is cold formed substantially to a thickness of the strip to be produced, for example by cold rolling of the strip material along a direction of rolling. The cold forming of the strip material may at the same time involve several cold rolling steps, with intermediate annealing of the strip material between the cold rolling steps. The intermediate annealing of the strip material between the cold rolling steps is conducted for example at a temperature of approximately 700° C.

Between the step 30 of hot rolling the ingot and step 40 of cold forming the strip material, intermediate annealing of the strip material may take place, for example at a temperature in excess of approximately 800° C.

In addition, in a process step 50, the strip material is annealed in a magnetic field, wherein the direction of the magnetic field is axially parallel to a transverse axis of the strip material and wherein the transverse axis of the strip material is at right-angles to the direction of rolling. Before the strip material is annealed in the magnetic field, it may be wound up, and the annealing of the strip material in the magnetic field then takes place on the wound strip material. Annealing of the strip material is preferably performed at a temperature above approximately 1000° C.

In a further process step 60, the cold-rolled annealed strip material undergoes tempering, typically at a temperature $T_A$ between 500° C.$\leq T_A \leq$700° C.

In addition, in a step 70 the narrow strip is produced from the cold-formed strip material by means of reducing a width of the rolled strip material substantially to a width of the strip to be produced, for example by cutting the strip material, wherein the width of the strip material is arranged at right-angles to the direction of rolling.

In a further process step 80, the strip to be produced is cut off from the narrow strip, substantially corresponding to a length of the strip to be produced, along the width of the narrow strip, by cutting to length.

The alloy may have a composition which is reproduced by the following general formula:

wherein M is at least one element, selected from the group consisting of Ni, Mn, Si, Cu, Al, Ti, V, Nb and W, wherein M' is at least one element, selected from the group consisting of C, N, S, P, B, H and O, and wherein the coefficients a, b, c, d, e, f satisfy the following relationships:

$a+b+c+d+e+f=100$(% by weight)

$25\leq b\leq 35$,
$5\leq c\leq 18$,
$0<d\leq 5$,
$0<e\leq 3$ and
$0\leq f\leq 1$.

Preferably the alloy has a coercive field strength $H_c$ with 450 A/cm$\leq H_c\leq$610 A/cm.

Also preferred is for the alloy to have a remanence $B_r$ with 1.10 T$\leq B_r\leq$1.25 T.

In a another embodiment, the alloy has a composition which is reproduced by the following general formula:

wherein M is at least one element, selected from the group consisting of Cu, Nb and Ti, wherein M' is at least one element, selected from the group consisting of C, N, S, P, B, H and O, and wherein the coefficients a, b, c, d, e, f satisfy the following relationships:

$a+b+c+d+e+f=100$(% by weight)

$5\leq b\leq 12$,
$12\leq c\leq 25$,
$13<d\leq 38$,
$0<e\leq 15$ and
$0\leq f\leq 1$.

The method according to this embodiment is especially suitable for the manufacture of a magnetic strip which has excellent coercive field strength $H_c$ and very good remanence $B_r$. In an especially preferred embodiment:
b=8, c=15, d=25 and 0<e<10.

Figure 2:
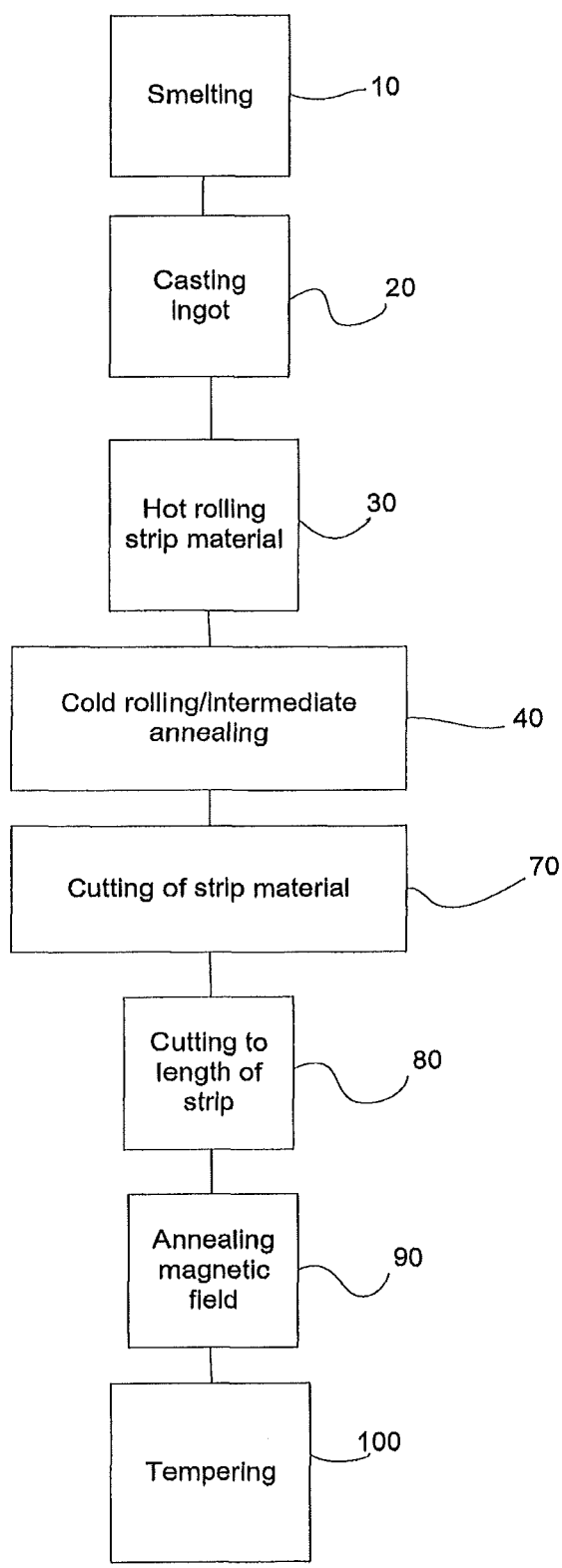
FIG. 2 shows a flow diagram with manufacturing steps for a magnetic strip according to a second embodiment disclosed herein.

FIG. 2 shows a flow diagram with production steps for a magnetic strip according to a second embodiment disclosed herein.

For this purpose, in a step 10, a semi-hard magnetic alloy is smelted in a crucible or oven under vacuum or in a protective gas atmosphere. Here the smelting is carried out for example at a temperature of approximately 1600° C.

In a step 20, an ingot is then formed, for example in a round ingot mould. In a further process step 30, the ingot is hot formed into strip material, typically by means of hot rolling. In another process step 40, the strip material is cold formed substantially to a thickness of the strip to be produced, for example by cold rolling of the strip material along a direction of rolling. The cold forming of the strip material may at the same time involve several cold rolling steps, with intermediate annealing of the strip material between the cold rolling steps. The intermediate annealing of the strip material between the cold rolling steps is conducted for example at a temperature of approximately 700° C.

Between the step 30 of hot rolling the ingot and step 40 of cold forming the strip material, intermediate annealing of the strip material may take place, for example at a temperature in excess of approximately 800° C.

In addition, in a step 70 the narrow strip is produced from the cold-formed strip material by means of reducing a width of the rolled strip material substantially to a width of the strip to be produced, for example by cutting the strip material, wherein the width of the strip material is arranged at right-angles to the direction of rolling.

In a further process step 80, the strip to be produced is cut off from the narrow strip, substantially corresponding to a length of the strip to be produced, along the width of the narrow strip, by cutting to length.

In addition, in a process step 90, the cut-off strip is annealed in a magnetic field, wherein the direction of the magnetic field is axially parallel to a transverse axis of the strip. Annealing of the cut-off strip is preferably performed at a temperature above approximately 1000° C.

After annealing of the cut-off strip, tempering is effected in a process step 100. The tempering is preferably carried out at a temperature $T_A$ between 500° C.$\leq T_A \leq$ 700° C.

The alloy may have a composition which is reproduced by the following general formula:

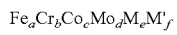

$$Fe_aCr_bCo_cMo_dM_eM'_f$$

wherein M is at least one element, selected from the group consisting of Ni, Mn, Si, Cu, Al, Ti, V, Nb and W, wherein M' is at least one element, selected from the group consisting of C, N, S, P, B, H and O, and wherein the coefficients a, b, c, d, e, f satisfy the following relationships:

$$a+b+c+d+e+f=100(\% \text{ by weight})$$

25≤b≤35,
5≤c≤18,
0<d≤5,
0<e≤3 and
0≤f≤1.

Preferably the alloy has a coercive field strength $H_c$ with 450 A/cm≤$H_c$≤610 A/cm.

Also preferred is for the alloy to have a remanence $B_r$ with 1.10 T≤$B_r$≤1.25 T.

In a another embodiment, the alloy has a composition which is reproduced by the following general formula:

$$Fe_aAl_bNi_cCo_dM_eM'_f$$

wherein M is at least one element, selected from the group consisting of Cu, Nb and Ti, wherein M' is at least one element, selected from the group consisting of C, N, S, P, B, H and O, and wherein the coefficients a, b, c, d, e, f satisfy the following relationships:

$$a+b+c+d+e+f=100(\% \text{ by weight})$$

5≤b≤12,
12≤c≤25,
13<d≤38,
0<e≤15 and
0≤f≤1.

This method is also especially suitable for the manufacture of a magnetic strip with a magnetic easy axis along the transverse axis of the strip.

In an especially preferred embodiment:
b=8, c=15, d=25 and 0<e<10.

Figure 3:
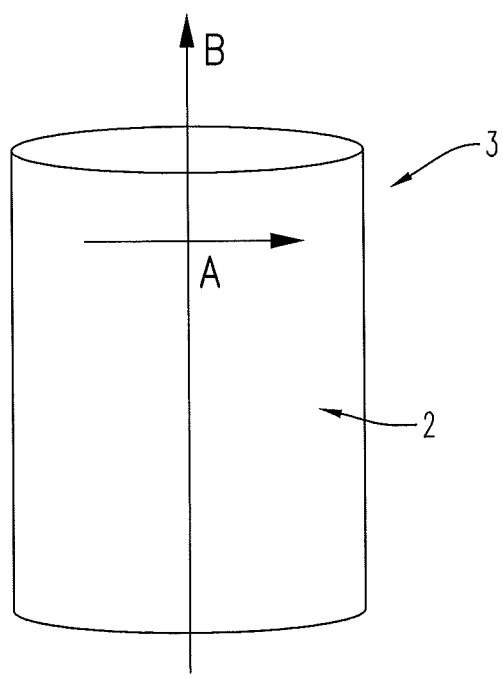
FIG. 3 shows the step of annealing strip material in a magnetic field according to the first embodiment disclosed herein.

FIG. 3 shows the step of annealing strip material 2 in a magnetic field in accordance with the first embodiment of the invention.

Before annealing of the strip material 2 in the magnetic field, the strip material 2 was wound up into a roll 3. Annealing of the strip material 2 is therefore carried out in the magnetic field on the wound-up strip material 2.

The direction of the magnetic field, shown schematically by an arrow direction B, is axially parallel to a transverse axis of the strip material 2, which is likewise shown schematically by arrow direction B. The transverse axis of the strip material 2 is at the same time at right-angles to the direction of rolling, which is represented schematically by an arrow direction A.

By means of the annealing in the magnetic field it is possible to set a magnetic easy axis of the strip material 2 along a transverse axis.

Figure 4:
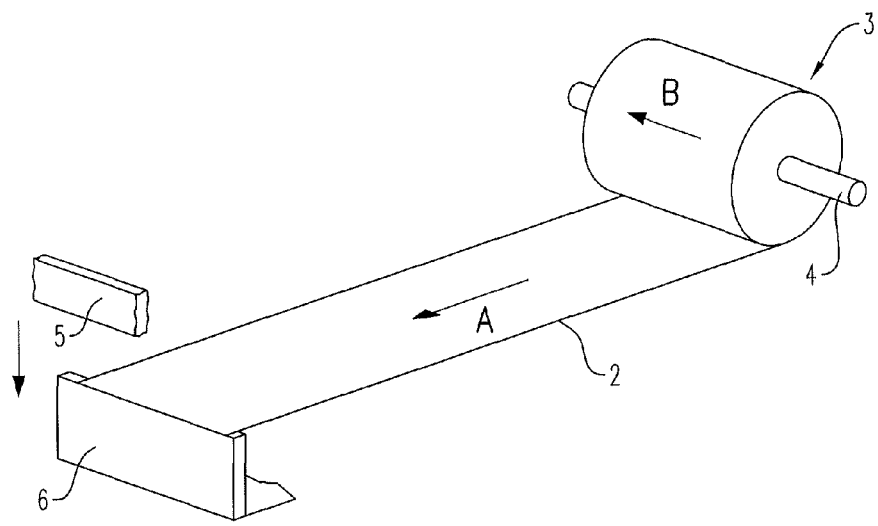
FIG. 4 shows the step of cutting off from the strip material a magnetic strip to be produced.

FIG. 4 shows the step of cutting from the strip material 2 a magnetic strip to be produced. Components with the same functions as in the preceding figures are identified by the same reference numbers and are not described in detail below.

For this purpose the strip material 2, which is partly rolled up on the roll 3 held by a shaft 4, is pulled away from the roll 3. Here the strip material 2 is made from a semi-hard magnetic crystalline alloy, the composition of which has already been specified in connection with FIG. 1 and FIG. 2, and has a magnetic easy axis running axially parallel to the transverse axis of the strip material 2, as shown schematically in FIG. 4 by arrow direction B. The transverse axis of the strip material 2 is at the same time at right-angles to the direction of rolling, which is shown schematically by arrow direction A.

Using the cutting devices 5 and 6 a magnetic strip, not shown in FIG. 4, is cut to length from the strip material 2. In this operation, the cutting to length takes place along the transverse axis of the strip material 2, substantially corresponding to the length of the strip.

Figure 5:
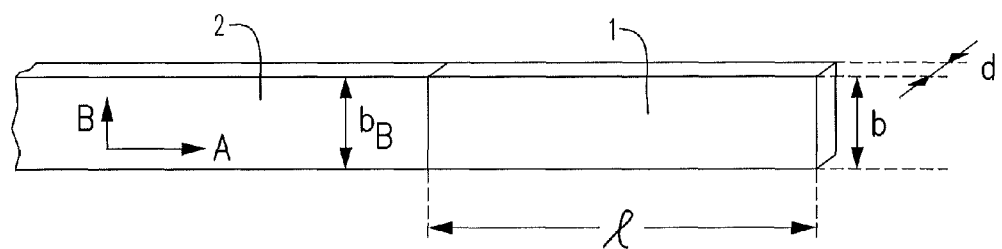
FIG. 5 shows a magnetic strip and the strip material from which the strip is cut to length, according to the first embodiment disclosed herein.

FIG. 5 shows a magnetic strip 1, and the strip material 2 of a semi-hard magnetic crystalline alloy from which the strip 1 is cut to length, in accordance with the first embodiment of the invention. Components with the same functions as in the preceding figures are identified by the same reference numbers and are not described in detail below.

The strip 1 is cut to length from the strip material 2 along the transverse axis of the strip material 2, which is shown schematically by arrow direction B, corresponding to a length 1 of the strip 1. The strip material 2 has, axially parallel to its transverse axis, also shown schematically by arrow direction B, a magnetic easy axis. The magnetic strip 1 consequently has a magnetic easy axis running axially parallel to a transverse axis of the strip 1, shown schematically by arrow direction B.

In the embodiment shown, a width $b_B$ of the strip material 2 corresponds to a width b of the strip 1. Because of this, the strip 1 may be produced even more easily, since the width $b_B$ of the strip material 2 already corresponds to a width b, so that further processing steps are not required.

In the embodiment shown, the relationship 0 m≤d≤0.1 mm applies for a thickness d of the strip 1.

The invention having been thus described with reference to certain specific embodiments and examples thereof, it will be understood that this is illustrative, and not limiting, of the appended claims.

The invention claimed is:

1. A method for the production of a magnetic strip of a semi-hard magnetic crystalline alloy, wherein the strip has a magnetic easy axis running axially parallel to a transverse axis of the strip, comprising:
   smelting of a semi-hard magnetic alloy;
   casting of the smelted alloy to form an ingot;
   hot forming of the ingot into strip material;
   cold forming of the strip material substantially to a thickness of the strip to be produced, by rolling the strip material along a direction of rolling;
   annealing the strip material in a magnetic field, wherein the direction of the magnetic field is axially parallel to a transverse axis of the strip material and wherein the transverse axis of the strip material is at right-angles to the direction of rolling;
   producing a narrow strip by reducing a width of the rolled strip material substantially to a width of the strip to be produced, wherein the width of the strip material and the width of the narrow strip are arranged at right-angles to the direction of rolling; and
   separating the strip to be produced from the narrow strip along the width of the narrow strip, thereby producing a separated strip having a length substantially corresponding to a length of the strip to be produced and having a width substantially corresponding to the width of the strip to be produced.

2. The method according to claim 1, further comprising winding up the strip material prior to annealing, and annealing the wound-up strip material in the magnetic field.

3. The method according to claim 1, wherein the annealing of the strip material takes place at a temperature in excess of approximately 1000° C.

4. The method according claim 1, further comprising tempering the strip material after annealing of the strip material.

5. The method according to claim 4, wherein the tempering occurs at a temperature $T_A$ between 500° C.$\leq T_A \leq$700° C.

6. The method according to claim 1, wherein the semi-hard magnetic crystalline alloy has a composition given by the formula:

$$Fe_aCr_bCo_cMo_dM_eM'_f$$

wherein M is at least one element, selected from the group consisting of Ni, Mn, Si, Cu, Al, Ti, V, Nb and W, wherein M' is at least one element, selected from the group consisting of C, N, S, P, B, H and O, and wherein the coefficients a, b, c, d, e, f satisfy the following relationships:

$$a+b+c+d+e+f=100(\% \text{ by weight})$$

25$\leq$b$\leq$35,

5$\leq$c$\leq$18,

0<d$\leq$5,

0<e$\leq$3 and

0$\leq$f$\leq$1.

7. The method according to claim 1, wherein the semi-hard magnetic crystalline alloy has a coercive field strength $H_c$ such that 450 A/cm$\leq H_c \leq$610 A/cm.

8. The method according to claim 1, wherein the semi-hard magnetic crystalline alloy has a remanence $B_r$ such that 1.10 T$\leq B_r \leq$1.25 T.

9. The method according to claim 1, wherein the semi-hard magnetic crystalline alloy has a composition given by formula:

$$Fe_aAl_bNi_cCo_dM_eM'_f$$

wherein M is at least one element, selected from the group consisting of Cu, Nb and Ti, wherein M' is at least one element, selected from the group consisting of C, N, S, P, B, H and O, and wherein the coefficients a, b, c, d, e, f satisfy the following relationships:

$$a+b+c+d+e+f=100(\% \text{ by weight})$$

5$\leq$b$\leq$12,

12$\leq$c$\leq$25,

13<d$\leq$38,

0<e$\leq$15 and

0$\leq$f$\leq$1.

10. The method according to claim 9, wherein b=8, c=15, d=25 and 0<e<10.

11. The method according to claim 1, wherein the width of the strip to be produced is smaller than the length of the strip to be produced.

12. The method according to claim 1, wherein the relationship 0 mm<d<0.1 mm applies to a thickness d of the strip to be produced.

13. The method according to claim 1, wherein producing the narrow strip comprises cutting the rolled strip material.

14. The method according to claim 1, wherein the separating of the strip to be produced is effected by means of cutting to length.

15. The method according to claim 1, wherein producing the narrow strip and separating the strip to be produced occur simultaneously by stamping.

16. The method according to claim 1, wherein the smelting occurs under vacuum.

17. The method according to claim 1, wherein the smelting occurs under a protective gas.

18. The method according to claim 1, wherein the hot forming of the ingot occurs at a temperature in excess of approximately 800° C.

19. The method according to claim 1, further comprising annealing of the strip material between the hot forming of the ingot and the cold forming of the strip material.

20. The method according to claim 19, wherein the annealing of the strip material is carried out at a temperature in excess of approximately 800° C.

21. The method according to claim 1, wherein the cold forming of the strip material comprises several cold rolling steps.

22. The method according to claim 21, further comprising annealing the strip material between the cold rolling steps.

23. The method according to claim 22, wherein the annealing of the strip material between the cold rolling steps occurs at a temperature of approximately 700° C.

24. A method for the production of a magnetic strip of a semi-hard magnetic crystalline alloy, wherein the strip has a magnetic easy axis running axially parallel to a transverse axis of the strip, comprising:
 smelting of a semi-hard magnetic alloy;
 casting of the smelted alloy to form an ingot;
 hot forming of the ingot into strip material;
 cold forming of the strip material substantially to a thickness of the strip to be produced, by rolling the strip material along a direction of rolling;
 producing of a narrow strip by reducing a width of the rolled strip material substantially to a width of the strip to be produced, wherein the width of the strip material and the width of the narrow strip are arranged at right-angles to the direction of rolling;
 cutting off the strip to be produced from the narrow strip along the width of the narrow strip, thereby producing a separated strip having a length substantially corresponding to a length of the strip to be produced and having a width substantially corresponding to the width of the strip to be produced; and
 annealing of the cut-off strip in a magnetic field, wherein the direction of the magnetic field is axially parallel to a transverse axis of the strip.

25. The method according to claim 24, wherein the annealing of the cut-off strip occurs at a temperature in excess of approximately 1000° C.

26. The method according claim 24, further comprising tempering the cut-off strip material after annealing of the cut-off strip.

27. The method according to claim 26, wherein the tempering occurs at a temperature $T_A$ between 500° C.$\leq T_A \leq$700° C.

* * * * *